United States Patent
Császár et al.

(10) Patent No.: US 9,801,186 B2
(45) Date of Patent: Oct. 24, 2017

(54) METHOD AND APPARATUS TO ADAPT THE DATA TRAFFIC OF A COMMUNICATION BETWEEN A USER EQUIPMENT AND A COMMUNICATION NETWORK

(75) Inventors: András Császár, Telki (HU); Attila Mihály, Dunakeszi (HU); Robert Szabo, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/399,437

(22) PCT Filed: May 10, 2012

(86) PCT No.: PCT/EP2012/058645
§ 371 (c)(1),
(2), (4) Date: Mar. 12, 2015

(87) PCT Pub. No.: WO2013/167190
PCT Pub. Date: Nov. 14, 2013

(65) Prior Publication Data
US 2015/0181607 A1    Jun. 25, 2015

(51) Int. Cl.
*H04M 11/00*     (2006.01)
*H04W 72/04*     (2009.01)
(Continued)

(52) U.S. Cl.
CPC ......... *H04W 72/0493* (2013.01); *H04L 47/10* (2013.01); *H04L 47/12* (2013.01);
(Continued)

(58) Field of Classification Search
CPC ................................................ H04W 72/0493
See application file for complete search history.

(56) References Cited

U.S. PATENT DOCUMENTS

| 2011/0208853 A1* | 8/2011 | Castro-Castro | ......... H04L 12/14 709/223 |
| 2012/0140022 A1* | 6/2012 | Kato | ....................... H04N 7/15 348/14.08 |

(Continued)

FOREIGN PATENT DOCUMENTS

| EP | 2096804 | 2/2009 |
| EP | 2 109 266 A1 | 10/2009 |

(Continued)

OTHER PUBLICATIONS

International Search Report and Written Opinion of the International Searching Authority, PCT Application No. PCT/EP2012/058645, Nov. 30, 2012.

(Continued)

*Primary Examiner* — Idowu O Osifade
(74) *Attorney, Agent, or Firm* — Sage Patent Group

(57) ABSTRACT

A method for adapting the data traffic of a communication between a user equipment and a communication network. The user equipment includes an entity for providing a service associated to the communication. The method includes determining actual operational status information of the service providing entity and creating an usage indicator based on said operational status information. Further the method includes the steps of sending the usage indicator to the communication network and adapting the data traffic of the communication in accordance with the usage indicator. A related user equipment provides the usage indicator to the communication network. A related traffic controller of a communication network adapts the data traffic of a communication between the user equipment and the communication network.

24 Claims, 3 Drawing Sheets

(51) Int. Cl.
*H04L 12/801* (2013.01)
*H04M 15/00* (2006.01)
*H04W 28/20* (2009.01)
H04L 12/813 (2013.01)
H04L 12/24 (2006.01)

(52) U.S. Cl.
CPC ........... *H04M 15/64* (2013.01); *H04W 28/20* (2013.01); *H04L 41/0893* (2013.01); *H04L 41/5029* (2013.01); *H04L 41/5041* (2013.01); *H04L 47/14* (2013.01); *H04L 47/20* (2013.01)

(56) References Cited

U.S. PATENT DOCUMENTS

| | | | |
|---|---|---|---|
| 2012/0281566 A1* | 11/2012 | Pelletier | H04W 76/046 370/252 |
| 2013/0132854 A1* | 5/2013 | Raleigh | G06F 3/0482 715/738 |
| 2015/0181607 A1* | 6/2015 | Csaszar | H04L 47/12 455/405 |

FOREIGN PATENT DOCUMENTS

| | | |
|---|---|---|
| WO | WO 2011/014828 A2 | 2/2011 |
| WO | WO 2011/058224 | 5/2011 |
| WO | WO 2011/058224 A1 | 5/2011 |

OTHER PUBLICATIONS

European Communication, EP Application No. 12721496.3, Jun. 23, 2016, 7 pages.

* cited by examiner

METHOD AND APPARATUS TO ADAPT THE DATA TRAFFIC OF A COMMUNICATION BETWEEN A USER EQUIPMENT AND A COMMUNICATION NETWORK

CROSS REFERENCE TO RELATED APPLICATION

This application is a 35 U.S.C. §371 national stage application of PCT International Application No. PCT/EP2012/058645, filed on 10 May 2012, the disclosure and content of which is incorporated by reference herein in its entirety. The above-referenced PCT International Application was published in the English language as International Publication No. WO 2013/167190 A1 on 14 Nov. 2013.

TECHNICAL FIELD

The invention is about a method for adapting the data traffic of a communication between a user equipment and a communication network, wherein the user equipment provides a service associated to the communication. The invention further relates to a user equipment and a traffic controller for implementing the method.

BACKGROUND

With the appearance of smart phones and tablets and the integration of already existing devices, like personal computers, into the communication networks these communication networks are showing continuously increasing data traffic. Users are downloading multimedia data like videos or audio data. On user devices several applications exists that periodically download most recent blog entries, portal news pages or videos for the user to be able to access this content instantly. With the increase of memory space in the end user devices the content will often be downloaded even if the user is currently not interested in consuming the content but on the other hand will consume the content later on.

Some content providers combine different media data, like audio and video data, in contents even if the user will only consume one type of media data, e.g. audio data, separately. This results in a large amount of traffic which is not used by the end user but which might cause high traffic load in the network.

In both 2g/3G and Long Term Evolution (LTE) network there is a standard way for the application server (AS) to request the establishment of a lower-than-best-effort bearer. FIG. 1 shows a schematic overview of a network according to prior art. A user equipment (UE) 10 is connected to a communication network comprising a radio scheduler 11 which is connected to a gateway 12. The gateway 12 comprises a bearer handler 13 which is adapted to select or adjust a bearer for a data transmission over the radio scheduler 11 to the UE 10. An application server 14 provides its service to a UE 10 by sending the related data traffic via the gateway 12 and the radio scheduling entity 11 to the UE 10. The application server 14 is able to send a downgrade request for its traffic to a policy charging and rules function (PCRF) 15. The PCRF 15 can be implemented in any kind of network node The PCRF is the part of the network architecture that aggregates information to and from the network, operational support systems, and other sources in real time, supporting the creation of rules and then automatically making intelligent policy decisions for each subscriber active on the network. After receipt of a downgrade or upgrade request the PCRF 15 sends a rule to the gateway 12 to adapt the bearer handler 13 to select a different bearer for the transport of the traffic from the application server 14 to the UE 10. The application server 14 communicates over the communication network with the UE 10.

The UE 10 is able to communicate via the communication network directly with the application server 14 which provides the service and can order an upgrade or downgrade of a service provision. If a different application server provides another service the UE 10 has to communicate with each specific application server to adapt each specific service provision. The communication network is not involved in the decision for adapting the data traffic between the UE 10 and the application server and is only used as an access pipe between the UE 10 and the application server 14.

SUMMARY

It is an objective of the present invention to improve traffic handling of a communication between a user equipment and a communication network. This objective is achieved by the independent claims. Advantageous embodiments are described in the dependent claims.

This objective is achieved in a method for adapting the data traffic of a communication between a user equipment and a communication network, wherein the user equipment comprises an entity for providing a service associated to the communication. The method comprises the steps of determining actual operational status information of the service providing entity and creating an usage indicator based on said operational status information. The method further comprises the steps of sending the usage indicator to the communication network and adapting the data traffic of the communication in accordance with the usage indicator.

The objective is further achieved by a user equipment for providing an usage indicator to a communication network to adapt the data traffic of a communication between the user equipment and the communication network, wherein the user equipment comprises an entity providing a service associated to the communication. The user equipment further comprises a first processing unit, adapted to determine the actual operational status of the service providing entity, a second processing unit, adapted to create a usage indicator based on said operational status information and a transmitter, adapted to send the usage indicator to the communication network.

Further the objective is achieved by a method in a traffic controller of a communication network for adapting the data traffic of a communication between a user equipment and the communication network. This method comprises the steps of receiving, from the user equipment, a usage indicator indicating the actual operational status a service providing entity in the user equipment associated to the communication and adapting the data traffic of the communication in accordance with the usage indicator.

Further the objective is achieved by a traffic controller of a communication network for adapting the data traffic of a communication between a user equipment and the communication network. The traffic controller comprises a receiver for receiving, from the user equipment, a usage indicator indicating the actual operational status of a service providing entity in the user equipment associated to the communication and an adaptor for adapting the data traffic of the communication in accordance with the usage indicator.

As one advantage of the invention the network operator can enhance the quality of experience for its subscriber by service differentiation based on user needs because the load in the network can be adapted according to the real usage of a service. Further it is possible to adapt the pricing model such that if the data traffic for a specific communication is reduced e.g. due to the fact that the user is in an idle mode or does only consume parts of the available communication data it is possible to reduce the payment for a specific data service.

The present invention also concerns computer programs comprising portions of software codes in order to implement the method as described above when operated by a respective processing unit of a user equipment and a recipient device. The computer program can be stored on a computer-readable medium. The computer-readable medium can be a permanent or rewritable memory within the user equipment or the recipient device or located externally. The respective computer program can also be transferred to the user equipment or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
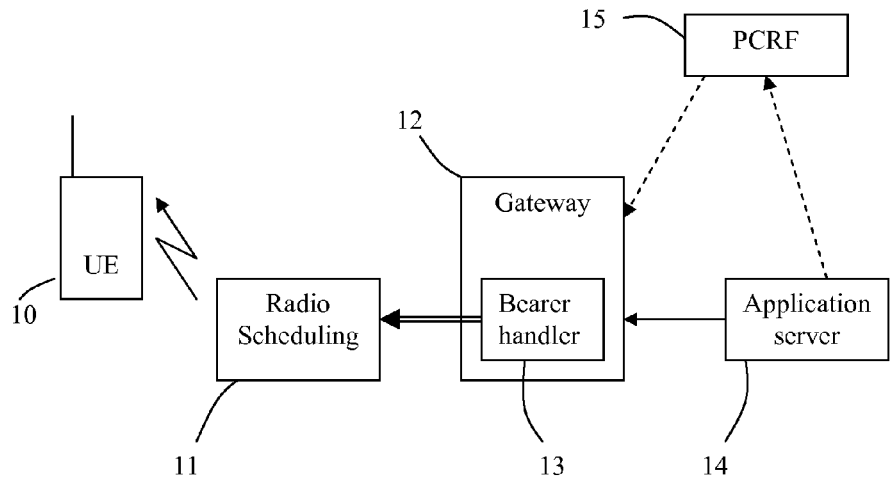
FIG. 1 shows a schematic overview of a network according to prior art.

Within the context of the present application, the term "user equipment" may particularly denote any kind of equipment which is adapted to receive data from a communication network and to provide any kind of service to a user of this user equipment. A user equipment may be a mobile terminal (e.g. a smartphone) or any other kind of computer terminal (e.g. desktop computer or laptop).

Within the context of the present application, the term "entity" may particularly denote any kind of hardware or software which is adapted to provide a service or part of a service to a user of the user equipment. The entity may be part of the user equipment or may be associated to the user equipment. An entity could be a screen which is adapted to show any kind of data to a user of the user equipment. An entity could also be a software application, like a video application, which is executed at the user equipment. The application could be active in the foreground of a window-based or any other graphical operating system or inactive in the background of the operating system.

Within the context of the present application, the term "service" may particularly denote any kind of content provision to a user of a user equipment. Services may e.g. be a provision of a video or audio file or the provision of a GPS-based routing system for navigation.

With the context of the present application, the term "communication" may particularly denote an exchange of data related to a specific service. As an example a communication comprising the transfer of a request for a video transmission and the data transfer of the video data from the network to the user equipment. Also further control data may be part of one communication. Communication therefore consists of data traffic between the communication network and the user equipment.

With the context of the present application, the term "communication network" may particularly denote a mobile communication network or any other network which is adapted to serve a user equipment. It is possible that a communication network is a local area network (LAN), a wide area network (WAN) or a Wifi network. It is further possible that the communication network is a 2G/3G or 4G mobile communication network.

The invention may comprise different ways how the usage indicator is transmitted from the user equipment to the communication network.

The usage indicator may be transmitted repeatedly to the network to make sure that the network is frequently updated with information about operational status information. The update time may be adapted according to the current network condition or load or may be updated dependent on the kind of service which is currently provided to a user. If the provision of a service needs a high network bandwidth for data transmission, like providing a high definition video to a user, there is a great benefit for the operator of the communication network if he can lower the bandwidth due to inactivity of the service providing entity. It is also possible that the update time is very long because the bandwidth savings is relatively small.

The usage indicator may be transmitted to the communication network if an operational status of the service providing entity is changed. This will reduce the amount of control data between the user equipment and the communication network.

The usage indicator may be transmitted to the communication network if the user equipment receives an indicator from the communication network which requests the usage indicator of this user equipment. The provision of the usage indicator on request from the network will reduce the amount of control data. The network may only request a usage indicator if the condition of the network becomes critical due to heavy network traffic. Therefore the usage indicator may only be sent to the communication network if the network requires such an indication from the user equipment to adapt load balancing between all connected user equipments.

The service providing entity may be a device of the user equipment. The device may be an input and or output device like a display or screen or a loudspeaker. The device may be a processing unit which processes a service like a graphics processor for calculating video code or a sound processor.

The service providing entity may be a software application. A software application may be a media player for displaying any kind of media or a navigation software for using a GPS signal in combination with a map to display the current position of a device.

The actual operational status may comprise actual hardware settings of the device. It may be possible that a hardware component is not operational due to a failure or any other kind of hardware error.

The actual operational status may comprise information if the service providing entity is in an idle mode. The entity could be in an idle mode to save power consumption. A screen may be dimmed or darken to reduce power consumption if the battery power of the user equipment is very low.

The actual operational status may comprise information if the service providing entity is blocked. An entity may be blocked by another service.

The actual operational status may comprise information which is manually entered into the user equipment. A user of the user equipment may therefore manually adjust the service provision because the user may not be able to receive a service. A user may be blind but wants to hear the audio part of a video.

The actual operational status may comprise information about one service providing entity of the user equipment that should be excluded from consideration for the adaptation of the data traffic of the communication. It may be important to keep up the volume of an alarm even if the loudspeaker is muted.

If the communication network is aware of the reason of the actual operating status it is possible to decide better how to adapt the data traffic for this specific service. If a hardware component is broken or a user blocks a specific service provision it makes no sense to just adapt the data traffic of the communication but to stop the provision of the whole service or part of the service. This may reduce the costs for a service provision for a user of a user equipment.

In one embodiment of the invention the traffic controller is allocated to a gateway node in the communication network which controls the data traffic of the communication between the user equipment and the communication network. In another embodiment of the invention the traffic controller is allocated to a radio network controller in the radio access network of the communication network.

In another embodiment of the invention the traffic controller is adapted to trigger the sending of a usage indicator from the user equipment by sending a request message to the user equipment. The trigger can be resulted from a high network load condition. The traffic controller may adapt the data rate of the communication in accordance with the usage indicator based on a current traffic condition in the communication network.

The data rate may be adapted by at least one of the following steps: selecting a transport bearer for the communication with a different quality of service, QoS, using a different transcoding for the communication or removing a data stream from the communication. Further it might be possible that the data rate is adapted by decreasing the framerate by dropping frames (e.g. every second frame might be dropped). Also other data rate adaptation methods are possible.

The traffic controller may indicate the adaptation of the data rate of the communication to a charging system to adjust the payment for a service based on the effective provision of the service.

Figure 2:
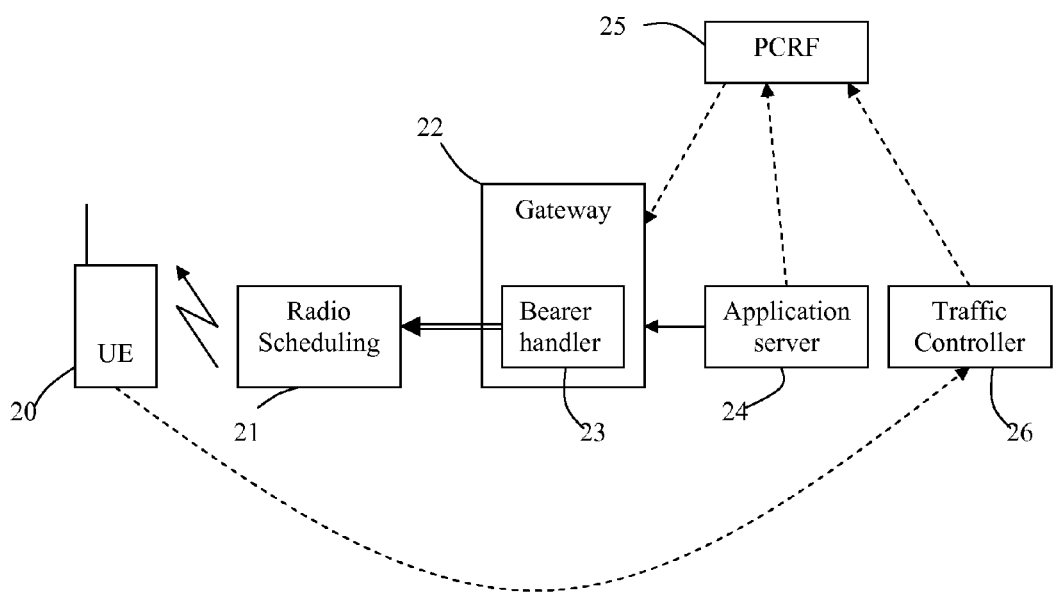
FIG. 2 shows a schematic overview of a network according to one embodiment of the invention.

FIG. 2 shows a schematic overview of a network according to one embodiment of the invention. A user equipment 20 is connected via a radio access network comprising a radio scheduler 21 with a communication network. This communication network comprises, among other not depicted nodes, a gateway 22 and a traffic controller 26.

The traffic controller 26 has been depicted as a sole entity or node but it is possible that the traffic controller is allocated in the gateway or in any other node in the core network of the communication network. In an UMTS network or 3G network the gateway 22 may be a gateway GPRS support node (GGSN). The traffic controller 26 may be integrated in such a GGSN or in a serving GPRS support node (SGSN). In an LTE/EPS network or 4G network the gateway 22 may be a serving gateway (S-GW). The traffic controller 26 may be integrated in such S-GW node or in any other node. It is also possible that the traffic controller 26 is allocated to a radio network controller of the communication network. In LTE the radio network controller may be an evolved Node B (eNodeB). In an UMTS network the radio network controller may be a RNC node. It is also possible that the traffic controller 26 is a single node located anywhere in the network which is directly reachable by the UE 20. The traffic controller 26 can send relevant information to the UE 20, e.g. a request for a usage indicator or a change of the sending frequency of the usage indicator.

The signaling endpoint for the UE 20 to reach the traffic controller 26 can be actively configured in the UE 20. One option would be to create a local DNS entry following some convention, e.g.: "tc.operator_domain". This entry can be used to dynamically assign different traffic controllers to a UE in different regions. Another option could be to extend the bearer configuration protocol with the necessary information (IP address or domain name) that configures the IP stack of the UE 20. In any of the above described cases the UE obtains an address, like an IP address, for which one requirement is that this address is routable within the operator's domain. It is possible to implement the previous described features by adding an application to the UE 20 that can be installed by the user or the network operator without any changes in standardization of the communication network.

According to the invention the UE 20 sends a usage indicator to the traffic controller 26 which is depicted in FIG. 2 as a broken line between the UE 20 and the traffic controller 26. The usage indicator may be a complete new message or may be a specific extension of the known radio link control (RLC) protocol. The traffic controller 26 needs to recognize the usage indicator in the message and must handle the payload of this message as the state report of the user equipment 20. The different operational status information could be encoded in an information element of the message. It is possible that each service providing entity status is represented by a single bit so that if this bit is high (1) the service providing entity is in an active status. If this bit is low (0) the service providing entity is in an inactive status. It is also possible that the information about an actual operational status comprises more information like the reason for being in a specific status (e.g. idle mode or hardware error). Further it is possible that the operational status information comprises more fine granular status description. A battery status e.g. could be a single bit to inform the communication network that the battery is depleted or not—or, in a more fine granular manner, the battery status could be a discrete value (e.g. percentage of o charge condition)

The usage indicator of different UEs may be taken into account by the traffic controller in case of a congestion situation in the network in order to enhance the overall Quality of Experience (QoE) of the subscribers in a given cell of the communication network.

A traffic marker may be implemented to mark data traffic related to the provision of a specific service in order to distinguish this data traffic from other traffic. The traffic marker may be a function which is allocated to a gateway node 22 or any other core node in the network. It is also possible that the traffic marker is allocated to the traffic controller 26 at the same location. The traffic differentiation may be applied on subscriber level or per session/application level if further information is available.

The traffic controller 26 may send a request to the PCRF 25 to adapt the data traffic for a specific service (see broken line between traffic controller 26 and PCRF 25). This request may also comprise a report for adapting the charging due to a downgraded or upgraded service provision. The PCRF 25 sends a rule to the bearer handler 23 of the gateway 22 (see broken line between PCRF 25 and gateway 22) to adapt the traffic data for a specific service. It is possible that a different audio or video codec with a lower or higher bitrate will be selected. It is further possible that a different bearer with a reduced or increased QoS will be selected by the bearer handler 23. QoS code point marking (e.g. IP DSCP or Ethernet priority bits) can be used in the transport network to handle packets with a proper precedence. It may be possible that in-packet code points may be observed by a radio network controller 21 to schedule the radio transmission accordingly.

If the usage indicator later on indicates an active service after the service has been downgraded before due to an inactive indication the user can immediately consume the service without any delay because just the quality has to be adapted.

Figure 3:
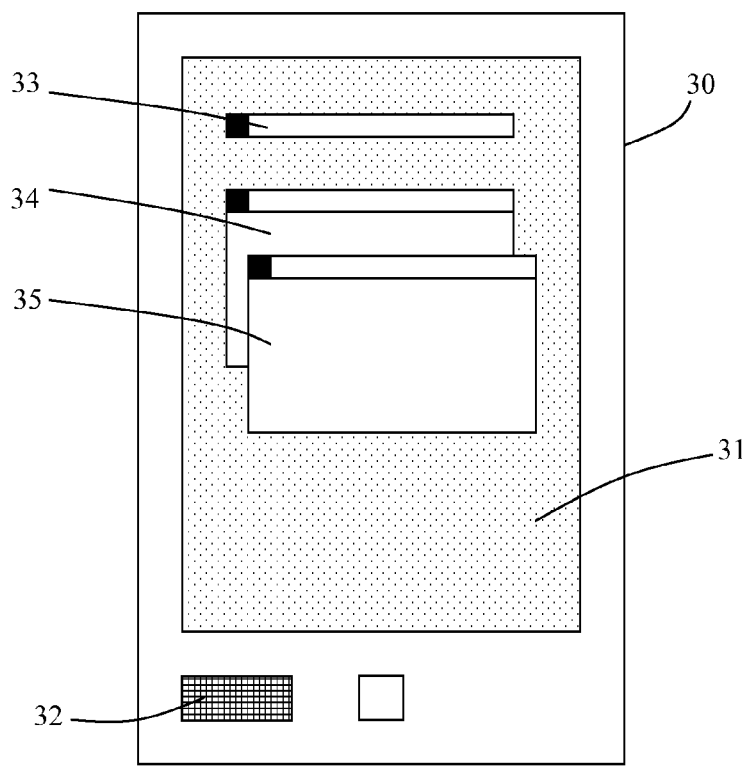
FIG. 3 shows a block diagram of a user equipment according to one embodiment of the invention.

FIG. 3 shows a block diagram of a user equipment 30 according to one embodiment of the invention. This user equipment 30 comprises a display or screen 31 which is adapted to show information to a user. In this embodiment the user equipment 30 may be a smartphone with a graphical operating system. This operating system is able to provide different services, like displaying a video, in different windows 33, 34, 35. Each window 33, 34, 35 may represent a service provision based on an application executed as a software application in the user equipment 30. The graphical operating system is able to allow the user of the user equipment 30 to inactivate or to activate an application executed in the window 33, 34, 35. In this embodiment, one window 33 is inactive. The application which is running in the inactivated window 33 may still be active in the background but the user does currently not interact with this application.

One application is running in a window 34 which is active but which has been put into the background of the screen 31 so that another active window 35 overlaps this window 34. The service which is provided by window 34 can also not be consumed by the user. If e.g. a video application is running as a service providing application in the display window 34 which is not in the foreground the user cannot consume the content of the video. A third window 35 is active and in the foreground of the screen. The application may actively be used by a user of the user equipment 30. The user equipment 30 further comprises a loudspeaker 32 as another service providing device.

This setup according FIG. 3 is just a momentary situation of a user equipment 30. According to the invention this user equipment 30 determines each actual operational status of each service providing entity. In this embodiment three service providing applications, executed in three windows 33, 34, 35, are currently available wherein two of the service providing applications, executed in the windows 33 and 34, are in the background or inactive and one service is active. The user equipment 30 creates a usage indicator indicating this actual status of all service providing applications and sends this indicator to a traffic controller of the communication network. The traffic controller is now aware of the status of all services and can adapt the data traffic for each service. It is also possible that the loudspeaker 32 is muted. Because the loudspeaker 32 is also a service providing device the user equipment 30 may also report this actual status to the traffic controller 26. It is possible that a muted loudspeaker may influence other service provisions and must therefore be considered when adapting the data traffic for all other services for this specific user equipment 30.

Even if FIG. 3 shows a window-based graphical operating system it is also possible that the operating system is not window based and that the applications are represented by icons. One example of such an graphical operating system is Android.

Figure 4:
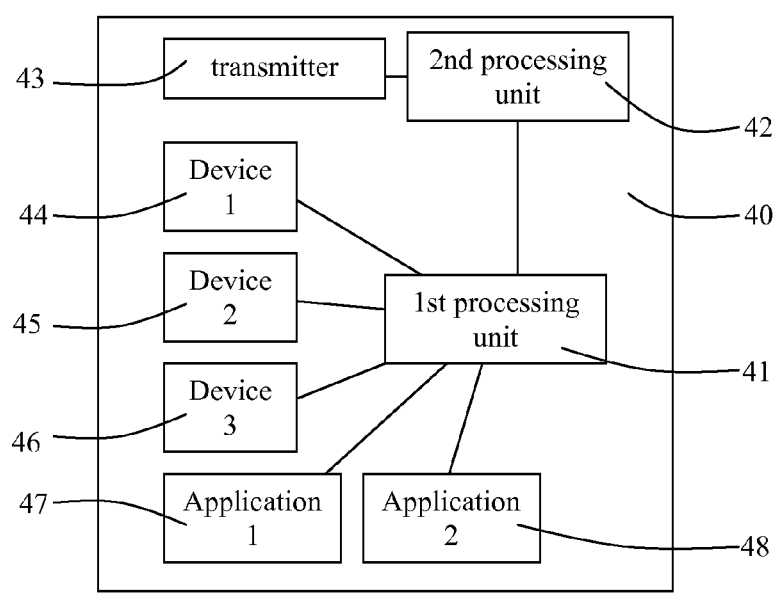
FIG. 4 shows a schematic overview of a user equipment according to one embodiment of the invention.

FIG. 4 shows a schematic overview of a user equipment 40 according to one embodiment of the invention. The user equipment 40 in this embodiment comprises three hardware devices 44, 45, 46 which are adapted to providing services. Further the user equipment 40 actually comprises two software applications 47, 48 which are adapted to provide services. A first processing unit 41 is adapted to determine the actual operational status of the service providing entities 44, 45, 46, 47, 48. A second processing unit 42 in the user equipment 40 is adapted to create a usage indicator based on said operational status information from the first processing unit 41. The user equipment further comprises a transmitter 43, adapted to send the usage indicator to the communication network. It is possible that the first processing unit 41 and the second processing unit 42 are combined in one processing unit.

Figure 5:
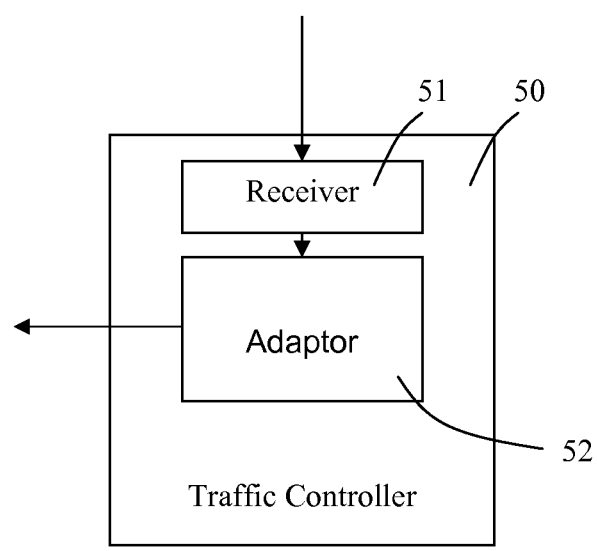
FIG. 5 shows a schematic overview of a traffic controller according to one embodiment of the invention.

FIG. 5 shows a schematic overview of a traffic controller 50 according to one embodiment of the invention. The traffic controller 50 is able to adapt the data traffic of a communication between a user equipment and the communication network and comprises a receiver for receiving, from the user equipment, an usage indicator indicating the actual operational status of a service providing entity in the user equipment associated to the communication. The traffic controller comprises further an adaptor 52 for adapting the data traffic of the communication in accordance with the usage indicator. The adaptor 52 may be a sending unit which transfers a request for adapting the data traffic to a PCRF or any other control node in the communication network controlling the data traffic provision to a user equipment. It is also possible that the adaptor 52 is part of a PCRF in the traffic controller 50.

The adaptor 52 may also directly acting on the data plane traffic. If the adaptor 52 is directly implemented in the data flow of the control data or user data it is possible that the adaptor 52 is able to directly adjust the data traffic flow.

The invention claimed is:

1. A method for adapting data traffic of a communication between a user equipment and an application server of a communication network, wherein the user equipment comprises a service providing entity that operates using the communication, and wherein the method comprises:

determining, by the user equipment, operational status information that indicates an operational status of the service providing entity that operates using the communication;

creating, by the user equipment, a usage indicator based on said operational status information;

sending, by the user equipment, the usage indicator to a traffic controller of the communication network, wherein the traffic controller is allocated to a gateway node in a core network of the communication network and wherein the traffic controller is different from the application server; and adapting, by the traffic controller and in the gateway node, the data traffic of the communication for a specific service which is provided by the service providing entity in accordance with the usage indicator, wherein the adapting comprises sending, by the traffic controller, a request associated with the communication to a policy charging and rules function (PCRF) operating in a node of the communication network.

2. The method according to claim 1, wherein the usage indicator is repeatedly transmitted to the traffic controller.

3. The method according to claim 1, wherein the usage indicator is transmitted to the traffic controller based on a change in an operational status of the service providing entity.

4. The method according to claim 1, wherein the usage indicator is transmitted to the traffic controller based on the user equipment receiving a request of the usage indication of the user equipment from the traffic controller.

5. The method according to claim 1, wherein:
the determining operational status information that indicates an operational status of the service providing entity associated with using the communication, comprises determining whether the service providing entity is in an idle mode not using the communication; and
the creating a usage indicator based on said operational status information, comprises creating the usage indicator to indicate whether the service providing entity was determined to be in an idle mode not using the communication; and
the adapting the data traffic of the communication in accordance with the usage indicator, comprises adapting a data rate at which the data traffic is communicated responsive to the usage indicator.

6. The method according to claim 5, wherein:
the service providing entity comprises a software application;
the determining whether the service providing entity is in an idle mode not using the communication, comprises determining whether the software application is running in an inactivated window of a display that does not use the communication; and
the creating the usage indicator to indicate whether the service providing entity was determined to be in an idle mode, comprises creating the usage indicator to indicate whether the software application was determined to be running in an inactivated window of the display.

7. The method according to claim 1, wherein:
the determining operational status information that indicates an operational status of the service providing entity associated with using the communication, comprises determining whether the service providing entity is blocked from operating using the communication; and
the creating a usage indicator based on said operational status information, comprises creating the usage indicator to indicate whether the service providing entity was determined to be blocked from operating using the communication; and
the adapting the data traffic of the communication in accordance with the usage indicator, comprises adapting a data rate at which the data traffic is communicated responsive to the usage indicator.

8. The method according to claim 7, wherein:
the service providing entity comprises a display or a loudspeaker of the user equipment;
the determining whether the service providing entity is blocked from operating using the communication, comprises determining whether the display is locked or the loudspeaker is muted; and
the creating the usage indicator to indicate whether the service providing entity was determined to be blocked from operating using the communication, comprises creating the usage indicator to indicate whether the display is determined to be locked or the loudspeaker is determined to be muted.

9. The method according to claim 1, wherein the actual operational status comprises information which is manually entered into the user equipment.

10. The method according to claim 1, wherein the usage indicator comprises information about one service providing entity of the user equipment that should be excluded from consideration for the adaptation of the data traffic of the communication.

11. The method according to claim 1, wherein the adapting of the data traffic of the communication in accordance with the usage indicator comprises selecting, based at least in part on the usage indicator, a first transcoding for the communication from a plurality of transcodings.

12. A user equipment for providing a usage indicator to a communication network which adapts, in a gateway node of the communication network, data traffic of a communication between a specific service provided by a service providing entity of the user equipment and an application server of the communication network, wherein the adapting comprises receiving, from a traffic controller of the communication network different from the application server, by a policy charging and rules function (PCRF) operating in the gateway node of the communication network, a request associated with the communication, wherein the user equipment comprises:
the service providing entity that operates using the communication;
a processor adapted to determine operational status information that indicates an operational status of the service providing entity that operates using the communication, and adapted to create a usage indicator based on said operational status information; and
a transmitter, adapted to send the usage indicator to the traffic controller of the communication network, the usage indicator being used by the traffic controller to generate the request.

13. The user equipment according to claim 12, wherein:
the service providing entity comprises a software application;
the processor determines the operational status information by determining whether the software application is running in an inactivated window of a display that does not use the communication; and
the processor creates the usage indicator to indicate whether the software application was determined to be running in an inactivated window of the display that does not use the communication; and
the transmitter adapts the data traffic of the communication by adapting a data rate at which the data traffic is communicated responsive to the usage indicator.

14. The user equipment according to claim 12, wherein:
the service providing entity is a display or a loudspeaker of the user equipment;
the processor determines the operational status information by determining whether the display is locked or the loudspeaker is muted, which blocks use of the communication; and
the processor creates the usage indicator to indicate whether the display is determined to be locked or the loudspeaker is determined to be muted; and
the transmitter adapts the data traffic of the communication by adapting a data rate at which the data traffic is communicated responsive to the usage indicator.

15. A method in a traffic controller allocated to a gateway node in a core network of a communication network for adapting data traffic in a gateway node of a communication between a specific service providing entity of a user equipment and an application server different from the traffic controller via the communication network, comprising:

receiving, from the user equipment, a usage indicator indicating operational status of the service providing entity that operates in the user equipment using the communication; and sending, by the traffic controller, a request associated with the communication to a policy charging and rules function (PCRF) operating in a gateway node of the communication network.

16. The method according to claim 15, wherein the traffic controller is allocated to a gateway node in the communication network which controls the data traffic of the communication between the user equipment and the communication network.

17. The method according to claim 15, wherein the traffic controller is allocated to a radio network controller in a radio access network of the communication network.

18. The method according to claim 15, wherein the traffic controller is adapted to trigger sending of a usage indicator from the user equipment by sending a request message from the traffic controller to the user equipment.

19. The method according to claim 15, wherein the traffic controller adapts a data rate of the communication in accordance with the usage indicator based on a current traffic condition in the communication network.

20. The method according to claim 19, wherein the data rate is adapted by at least one of the following:

selecting a transport bearer for the communication with a different quality of service, QoS;

using a different transcoding for the communication;

removing a data stream from the communication.

21. The method according to claim 15, wherein the adapting of the data traffic of the communication in accordance with the usage indicator comprises selecting, based at least in part on the usage indicator, a first transcoding for the communication from a plurality of transcodings.

22. A traffic controller allocated to a gateway node in a core network of a communication network for adapting data traffic of a communication between a specific service provided by a service providing entity of a user equipment and an application server different from the traffic controller via a communication network, comprising:

a receiver for receiving, from the user equipment, a usage indicator indicating an actual operational status of the service providing entity that operates in the user equipment using the communication; and an adaptor configured to send a request to a policy charging and rules function (PRCF) in the gateway node based on the actual operational status of the service providing entity.

23. The traffic controller according to claim 22, wherein the traffic controller is allocated to a gateway node in the communication network which controls the data traffic of the communication between the user equipment and the communication network.

24. The traffic controller according to claim 22, wherein the adaptor is configured to adapt the data traffic of the communication in accordance with the usage indicator by selecting, based at least in part on the usage indicator, a first transcoding for the communication from a plurality of transcodings.

* * * * *